(12) United States Patent
Gong et al.

(10) Patent No.: US 11,519,711 B2
(45) Date of Patent: Dec. 6, 2022

(54) ROTOR APPARATUS AND APPARATUS FOR DETECTING ANGULAR POSITION OF ROTOR

(71) Applicant: SAMSUNG ELECTRO-MECHANICS CO., LTD., Suwon-si (KR)

(72) Inventors: Jung Chul Gong, Suwon-si (KR); Joo Yul Ko, Suwon-si (KR); Bon Young Koo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 8 days.

(21) Appl. No.: 17/349,091

(22) Filed: Jun. 16, 2021

(65) Prior Publication Data

US 2022/0260356 A1 Aug. 18, 2022

(30) Foreign Application Priority Data

Feb. 17, 2021 (KR) .......................... 10-2021-0020931

(51) Int. Cl.
*G01B 7/30* (2006.01)
*G01D 5/20* (2006.01)

(52) U.S. Cl.
CPC ........ *G01B 7/30* (2013.01); *G01D 5/20* (2013.01)

(58) Field of Classification Search
CPC .................................... G01B 7/30; G01D 5/20
See application file for complete search history.

(56) References Cited

U.S. PATENT DOCUMENTS

| 10,718,637 | B2* | 7/2020 | Cai ......................... G01L 3/105 |
| 2010/0001718 | A1* | 1/2010 | Howard ................. G01B 7/003 |
| | | | 324/207.15 |
| 2010/0156402 | A1* | 6/2010 | Straubinger ......... G01D 5/2225 |
| | | | 324/207.25 |
| 2010/0301843 | A1* | 12/2010 | Kronowitter ........ G01D 5/2053 |
| | | | 324/207.25 |
| 2013/0284909 | A1 | 10/2013 | Ohtomo et al. |
| 2016/0223362 | A1* | 8/2016 | Werner .............. G01D 5/24419 |
| 2020/0033160 | A1 | 1/2020 | Kim et al. |

FOREIGN PATENT DOCUMENTS

| JP | 2012-122780 A | 6/2012 |
| JP | 5973773 B2 | 8/2016 |
| KR | 10-2020-0012667 A | 2/2020 |

* cited by examiner

*Primary Examiner* — Akm Zakaria
(74) *Attorney, Agent, or Firm* — NSIP Law

(57) ABSTRACT

A rotor apparatus includes: a rotor configured to rotate around a rotational axis; an angular position identification layer disposed to surround the rotational axis and configured to rotate according to rotation of the rotor, and having a width varying with angular positions of the rotor; and an angular range identification layer disposed to surround the rotational axis and configured to rotate according to the rotation of the rotor, and configured such that a plurality of portions of the angular range identification layer respectively corresponding to a plurality of different angular position ranges of the rotor have different overall widths.

17 Claims, 16 Drawing Sheets

ROTOR APPARATUS AND APPARATUS FOR DETECTING ANGULAR POSITION OF ROTOR

CROSS-REFERENCE TO RELATED APPLICATIONS

This application claims the benefit under 35 U.S.C. § 119(a) of Korean Patent Application No. 10-2021-0020931 filed on Feb. 17, 2021 in the Korean Intellectual Property Office, the entire disclosure of which is incorporated herein by reference for all purposes.

BACKGROUND

1. Field

The following description relates to a rotor apparatus and an apparatus for detecting an angular position of a rotor.

2. Description of Related Art

Recently, types and designs of electronic devices have been diversified. User demands for electronic devices have also been diversified, and a variety of requirements have been suggested for functions and designs of electronic devices.

Accordingly, an electronic device may include a rotor configured to perform various functions demanded by users, through efficient movement and design of the rotor.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a rotor apparatus includes: a rotor configured to rotate around a rotational axis; an angular position identification layer disposed to surround the rotational axis and configured to rotate according to rotation of the rotor, and having a width varying with angular positions of the rotor; and an angular range identification layer disposed to surround the rotational axis and configured to rotate according to the rotation of the rotor, and configured such that a plurality of portions of the angular range identification layer respectively corresponding to a plurality of different angular position ranges of the rotor have different overall widths.

The angular position identification layer and the angular range identification layer may include any one or any combination of any two or more of copper, silver, gold, and aluminum as a material different from a material of the rotor, respectively.

The angular position identification layer may include: a first angular position identification layer disposed to surround the rotational axis and configured to rotate according to the rotation of the rotor, and having a width varying with the angular positions of the rotor in a plurality of cycles per turn around the rotational axis; and a second angular position identification layer disposed to surround the rotational axis rotor and configured to rotate according to the rotation of the rotor, and having a width varying with the angular positions of the rotor at the plurality of cycles per turn around the rotational axis, wherein the first and second angular position identification layers are disposed to be spaced apart from each other.

Each of the first and second angular position identification layers may have a sinusoidal wave-shaped boundary line.

An angular position of the rotor, among the angular positions of the rotor, corresponding to a maximum width of the first angular position identification layer may be different from an angular position of the rotor, among the angular positions of the rotor, corresponding to a maximum width of the second angular position identification layer.

A length of the first angular position identification layer per cycle of the plurality of cycles may be identical to a length of the second angular position identification layer per cycle of the plurality of cycles. A difference between the angular position of the rotor corresponding to the maximum width of the first angular position identification layer and the angular position of the rotor corresponding to the maximum width of the second angular position identification layer may be equal to ¼ times the length of each of the first and second angular position identification layers per cycle.

The width varying with angular positions of the rotor may vary at a plurality of cycles per turn around the rotational axis. A length of each of the plurality of angular position ranges of the angular range identification layer may be identical to a length of the angular position identification layer per cycle of the plurality of cycles.

Each of the plurality of portions respectively corresponding to the plurality of angular position ranges of the angular range identification layer may have a constant width.

The angular range identification layer may have an angular shape between the plurality of portions of the angular range identification layer respectively corresponding to the plurality of angular position ranges of the rotor. The angular position identification layer may have a smoother boundary line than the angular portion of the angular range identification layer in the plurality of cycles.

One of the plurality of portions of the angular range identification layer corresponding to the plurality of angular position ranges of the rotor may include a portion having a width of 0 or a cut off portion.

In another general aspect, a rotor apparatus includes: a rotor configured to rotate around a rotational axis; an angular position identification layer disposed to surround the rotational axis rotor and configured to rotate according to rotation of the rotor, and having a width varying with angular positions of the rotor; and an angular range identification layer disposed to surround the rotational axis and configured to rotate according to the rotation of the rotor, wherein the angular range identification layer is configured to surround the rotational axis in a first surrounding range shorter than a second surrounding range in which the angular position identification layer surrounds the rotational axis.

The angular range identification layer may have a constant width. The angular position identification layer may have a minimum width greater than zero. The second surrounding range may be one turn of the rotor.

The angular range identification layer may be configured such that a plurality of portions of the angular range identification layer respectively corresponding to a plurality of different angular position ranges of the rotor have different overall widths. The width varying with angular positions of the rotor may vary in at least three cycles per turn around the rotational axis.

The angular position identification layer may include: a first angular position identification layer disposed to surround the rotational axis and configured to rotate according to rotation of the rotor, and having a width varying with the angular positions of the rotor in a plurality of cycles per turn around the rotational axis; and a second angular position identification layer disposed to surround the rotational axis and configured to rotate according to the rotation of the rotor, and having a width varying with the angular positions of the rotor at the plurality of cycles per turn around the rotational axis, wherein the first and second angular position identification layers are disposed to be spaced apart from each other.

An angular position of the rotor, among the angular positions of the rotor, corresponding to a maximum width of the first angular position identification layer may be different from an angular position of the rotor, among the angular positions of the rotor, corresponding to a maximum width of the second angular position identification layer.

In another general aspect, an apparatus for detecting an angular position of a rotor includes: an angular position identification inductor; an angular range identification inductor; a rotor configured to rotate around a rotational axis; an angular position identification layer disposed to surround the rotational axis and configured to rotate according to rotation of the rotor, and configured to change an inductance of the angular position identification inductor according to angular positions of the rotor; and an angular range identification layer disposed to surround the rotational axis and configured to rotate according to the rotation of the rotor, and configured such that an overall inductance of the angular range identification inductor is different in a plurality of different angular position ranges of the rotor.

The apparatus may further include a processor configured to generate an angular position value corrected from the inductance of the angular position identification inductor, based on one correction logic selected based on the inductance of the angular range identification inductor, among a plurality of correction logics.

The angular position identification layer may include first and second angular position identification layers arranged to surround the rotational axis, and configured to rotate according to the rotation of the rotor, respectively. The angular position identification inductor may include a first angular position identification inductor disposed closer to the first angular position identification layer, compared to the second angular position identification layer, and a second angular position identification inductor disposed closer to the second angular position identification layer, compared to the first angular position identification layer. The first and second angular position identification layers may be configured such that an angular position of the rotor, among the angular positions of the rotor, at which the first angular position identification inductor has a maximum inductance or a minimum inductance is different from an angular position of the rotor, among the angular positions of the rotor, at which the second angular position identification inductor has a maximum inductance or a minimum inductance.

The apparatus may further include a processor configured to generate a comprehensive value of first and second inductances of the first and second angular position identification inductors, based on one correction logic selected based on the inductance of the angular range identification inductor, among a plurality of correction logics.

The comprehensive value of the first and second inductances may be a value obtained by arc-tangent (arctan) processing a value in which one of the first and second inductances is a denominator variable and remaining inductance is a numerator variable.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
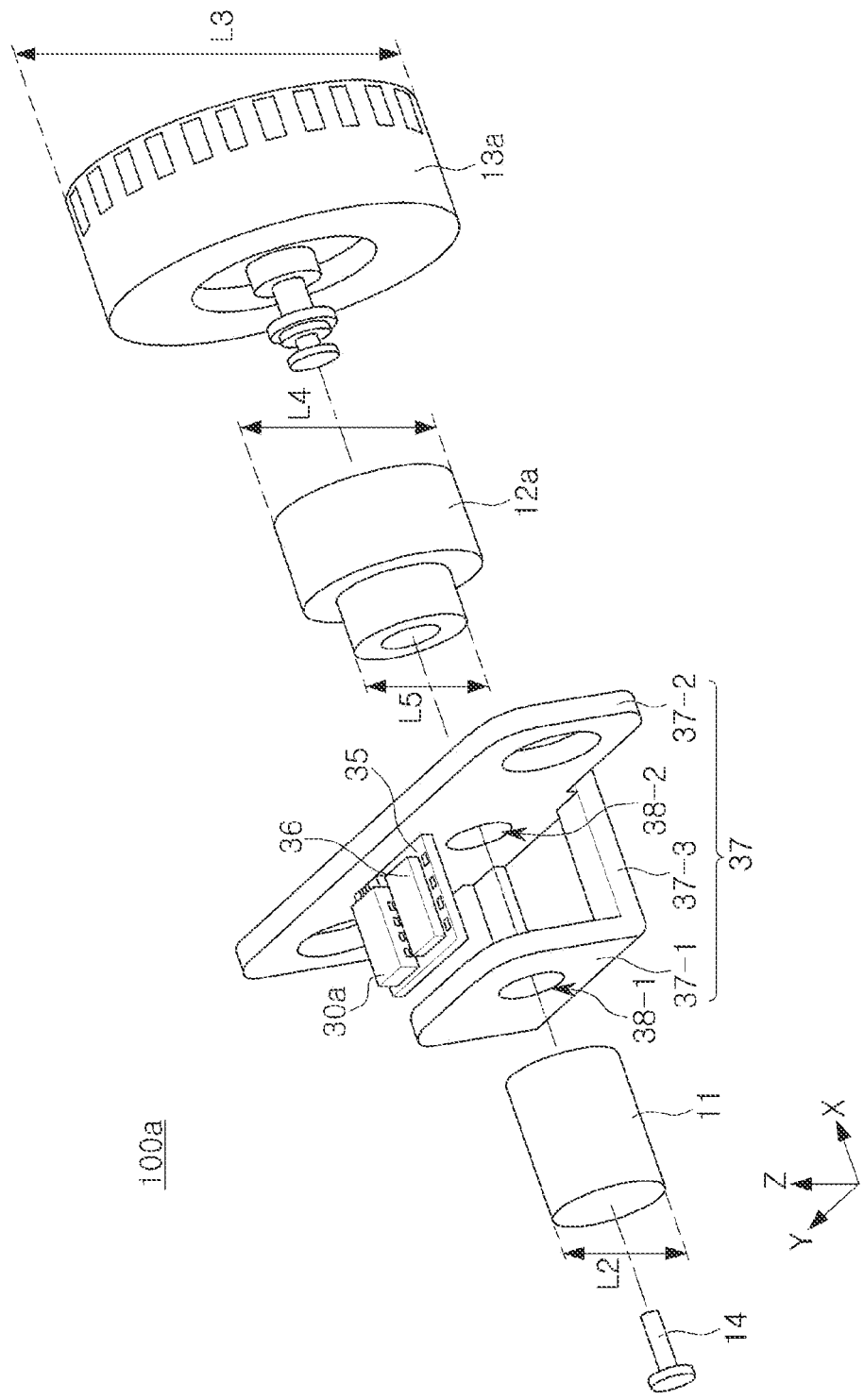
FIG. 1 is an exploded view illustrating a detailed form of a rotor apparatus and an apparatus for detecting an angular position of a rotor, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

FIG. 1 is an exploded view illustrating a detailed form of a rotor apparatus and an apparatus for detecting an angular position of a rotor, according to an embodiment.

Referring to FIG. 1, a rotor apparatus and an apparatus for detecting an angular position of a rotor 100a may include a rotor 11, a rotating connector 12a, a rotating head 13a, a pin 14, an identification inductor 30a, a substrate 35, a processor 36, and a fixing member 37.

One end of the rotor 11 may be coupled to the rotating head 13a through the rotating connector 12a, and the other end of the rotor 11 may be coupled to the pin 14. A structure in which the rotor 11, the rotating connector 12a, the rotating head 13a, and the pin 14 are coupled to one another may rotate around a rotational axis (e.g., an X axis). For example, the rotor 11, the rotating connector 12a, the rotating head 13a, and the pin 14 may rotate together around the rotational axis (e.g., the X axis). For example, the rotor 11 may have a cylindrical shape or a polygonal column (e.g., an octagonal column) shape.

The rotating head 13a may be configured such that torque may be efficiently applied from an external entity. For example, the rotating head 13a may have a plurality of grooves configured such that a human hand does not slide while the hand is in contact with the rotating head 13a. For example, the rotating head 13a may have a diameter L3 greater than a diameter L2 of the rotor 11, such that a human hand can effectively exert force on the rotating head 13a. For example, the rotating head 13a may be a crown of a watch, but is not limited thereto.

For example, either one or both of the rotor 11 and the rotating head 13a may include a plastic material. Therefore, the apparatus 100a may be lightweight, such that the rotor 11 and the rotating head 13a may be easily rotated by the human hand.

The rotating connector 12a may be configured to efficiently rotate according to the torque applied to the rotating head 13a. For example, the rotating connector 12a may have a spindle structure, and may be coupled to the rotating head 13a by screw connection. For example, the rotating connector 12a may have a cylindrical shape in which a diameter L4 of one end of the rotating connector 12a is different from a diameter L5 of the other end of the rotating connector 12a.

The structure in which the rotor 11, the rotating connector 12a, the rotating head 13a, and the pin 14 are coupled to one another may be disposed on the fixing member 37. The fixing member 37 may be configured to be fixed to an electronic device.

For example, the fixing member 37 may have a structure in which a first part 37-1, a second part 37-2, and a third part 37-3 are coupled to one another. The first and second parts 37-1 and 37-2 may have first and second through-holes 38-1 and 38-2, respectively, and the third part 37-3 may be connected between the first and second parts 37-1 and 37-2 and may be configured to extend perpendicular to the first and second parts 37-1 and 37-2.

The rotor 11 may be disposed to penetrate at least one of the first and second through-holes 38-1 and 38-2. Therefore, the rotor 11 may maintain a spacing distance from the identification inductor 30a during rotation and may stably rotate. Therefore, the rotor 11 may have longer lifespan.

The fixing member 37 may fix a positional relationship between the identification inductor 30a and the rotor 11. For example, the identification inductor 30a may be fixed on the substrate 35, and the substrate 35 may be fixed on the fixing member 37.

The substrate 35 may have a structure in which at least one wiring layer and at least one insulating layer are alternately stacked, such as a printed circuit board (PCB), and the identification inductor 30a may be electrically connected to the wiring layer of the substrate 35.

The processor 36 may be disposed on the substrate 35 and may be electrically connected to the identification inductor 30a through a wiring layer of the substrate 35. For example, the processor 36 may be implemented as an integrated circuit, and may be mounted on the upper surface of the substrate 35.

The processor 36 may generate an angular position value on the basis of inductance of the identification inductor 30a. For example, the processor 36 may output an output signal to the identification inductor 30a, and may receive an input signal based on the output signal and inductance of the identification inductor 30a. Since a resonant frequency of the output signal may be dependent on inductance of the identification inductor 30a, the processor 36 may recognize inductance of the identification inductor 30a by detecting the resonant frequency of the output signal, and may generate an angular position value corresponding to the inductance of the identification inductor 30a.

The identification inductor 30a may form magnetic flux according to the output signal received from the processor 36. The identification inductor 30a may be disposed to output magnetic flux towards the rotor 11. For example, the identification inductor 30a may have a coil shape, and may have a structure in which at least one coil layer and at least one insulation layer, each including a wound wire, are alternately stacked.

FIGS. 2A to 2D are perspective views illustrating structures for detecting an angular position of a rotor, according to embodiments.

Figure 2A:
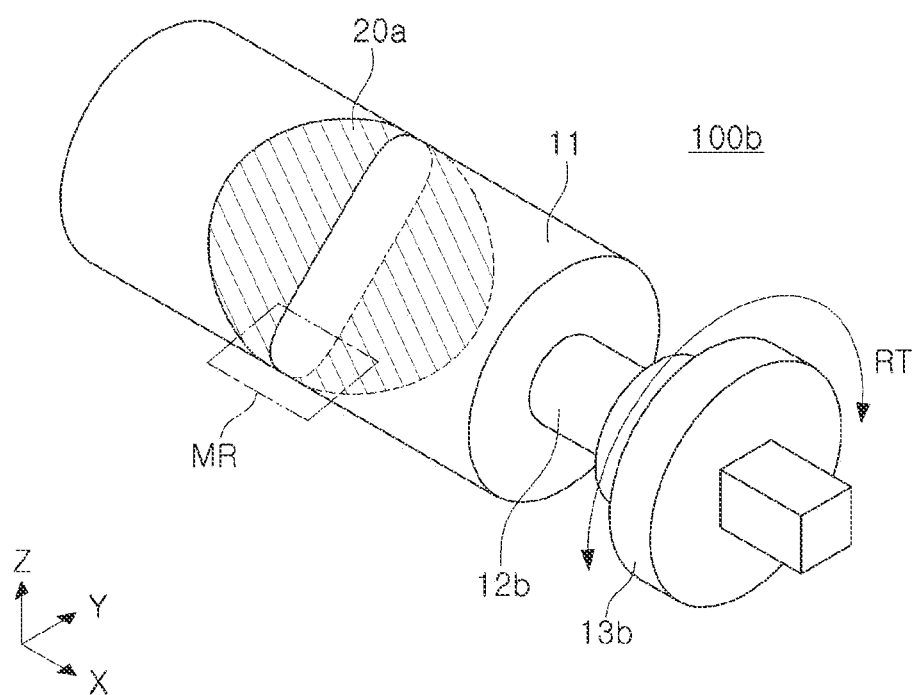
FIGS. 2A to 2D are perspective views illustrating structures for detecting an angular position of a rotor, according to an embodiment.

Referring to FIG. 2A, a rotor apparatus and an apparatus for detecting an angular position of a rotor 100b may include the rotor 11 and an angular position identification layer 20a.

The rotor 11 may be configured to rotate in a clockwise (RT) direction or a counterclockwise direction around a rotational axis (e.g., an X axis). Magnetic flux around the rotor 11 may pass through a magnetic flux region MR of a side surface of the rotor 11. An angular position of the magnetic flux region MR may be determined according to rotation of the rotor 11.

The angular position identification layer 20a may be disposed to surround the side surface of the rotor 11 and may have a width varying depending on the angular position of the rotor 11. For example, the angular position identification layer 20a may be plated on the side surface of the rotor 11, and may be inserted into the rotor 11 in the form of a ring in a state of being manufactured beforehand.

The magnetic flux passing through the magnetic flux region MR on the side surface of the rotor 11 may form an eddy current of the angular position identification layer 20a. Since a direction of the eddy current is similar to a direction of current of a coil, the eddy current may work as a parasitic inductor and may provide parasitic inductance.

The greater the diameter of the coil, the greater the inductance of the coil may be, and the greater the diameter of the region forming the eddy current, the greater the inductance according to the eddy current may be.

The greater the width of a portion corresponding to the magnetic flux region MR in the angular position identification layer 20a, the greater the diameter of the region forming the eddy current may be.

Since the width of the angular position identification layer 20a may vary according to the angular position of the rotor 11, the diameter of the region forming the eddy current formed on the angular position identification layer 20a may vary according to the angular position of the rotor 11. For example, the inductance according to the eddy current dependent on the magnetic flux passing through the magnetic flux region MR may vary according to the angular position of the rotor 11.

Therefore, the angular position identification layer 20a may provide inductance dependent on a degree of rotation of the rotor 11.

Precision and accuracy of the angular position identification of the rotor 11 may be higher as a rate of change of the inductance of the eddy current according to the change in width of the angular position identification layer 20a increases.

For example, the angular position identification layer 20a may include any one or any combination of any two or more of copper, silver, gold, and aluminum. Therefore, the angular position identification layer 20a may have high conductivity such that the angular position identification layer 20a may form a larger eddy current.

One end of the rotor 11 may be coupled to the rotating head 13b through the rotating connector 12b. The rotating head 13b may include a plastic material having a lighter weight, compared to the angular position identification layer 20a.

Figure 2B:
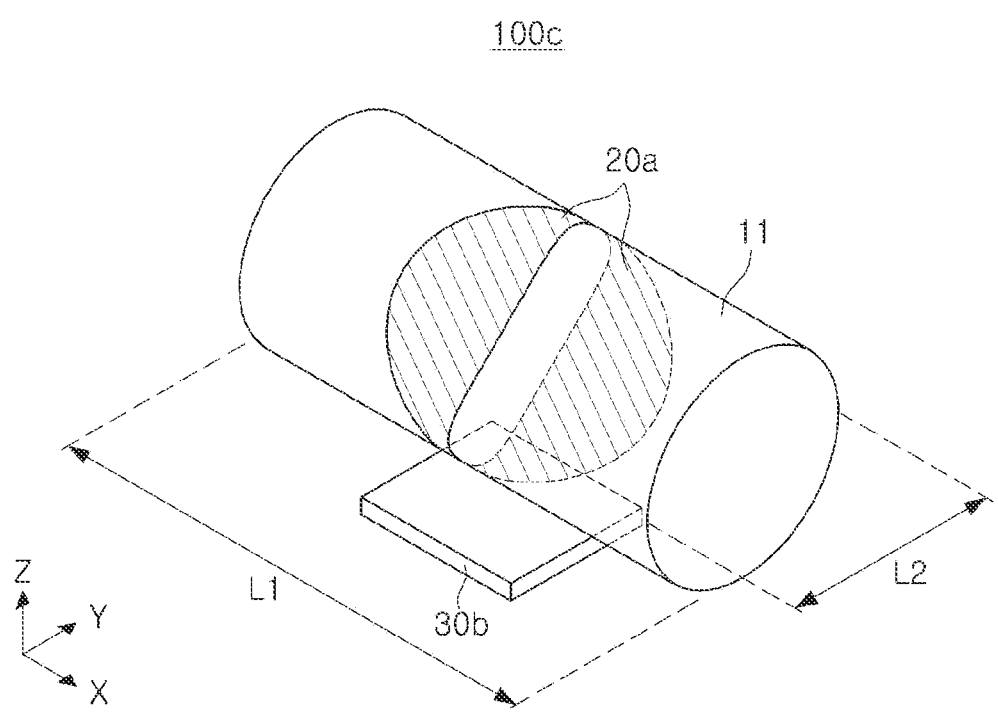

Referring to FIG. 2B, a rotor apparatus and an apparatus for detecting an angular position of a rotor 100c may have a structure in which a rotating connector and a rotating head are not provided.

An identification inductor 30b may be disposed to overlap an angular position identification layer 20a in a normal direction of a side surface of the rotor 11.

Figure 2C:
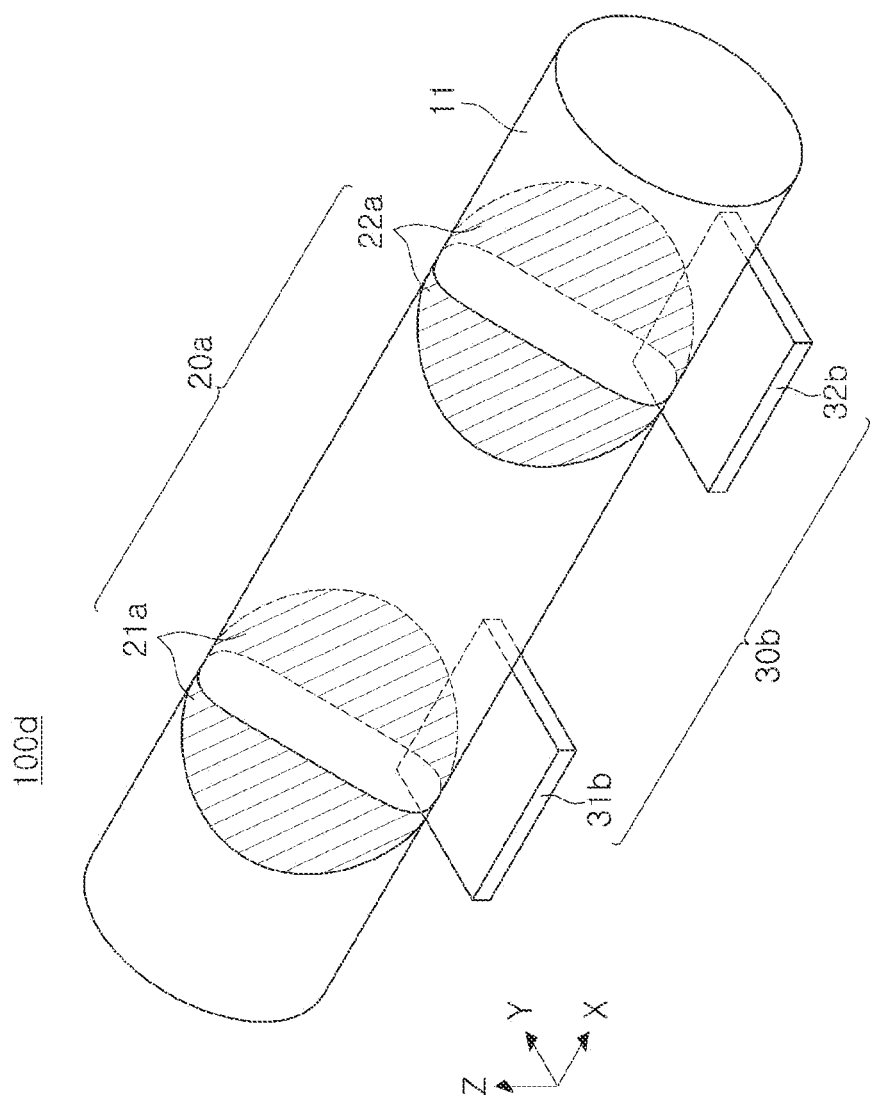

Referring to FIG. 2C, an angular position identification layer 20a in a rotor apparatus and an apparatus for detecting an angular position of a rotor 100d may include a first angular position identification layer 21a and a second angular position identification layer 22a, and an identification inductor 30b may include a first angular position identification inductor 31b and a second angular position identification inductor 32b.

The first angular position identification layer 21a may be disposed to surround a side surface of a rotor 11 and may have a width varying depending on an angular position of the rotor 11.

The second angular position identification layer 22a may be disposed to be spaced apart from the first angular position identification layer 21a and to surround the side surface of the rotor 11, and may have a width varying depending on an angular position of the rotor 11.

Changes in first and second inductance of the first and second identification inductors 31b and 32b, respectively according to first and second eddy currents of the first and second angular position identification layers 21a and 22a, respectively, according to rotation of the rotor 11 may be used together to identify the angular position of the rotor 11.

Therefore, an excessive increase in difference between a maximum width and a minimum width of each of the first and second angular position identification layers 21a and 22a may be prevented, such that linearity of inductance change according to changes in the width of each of the first and second angular position identification layers 21a and 22a may be improved.

Figure 2D:
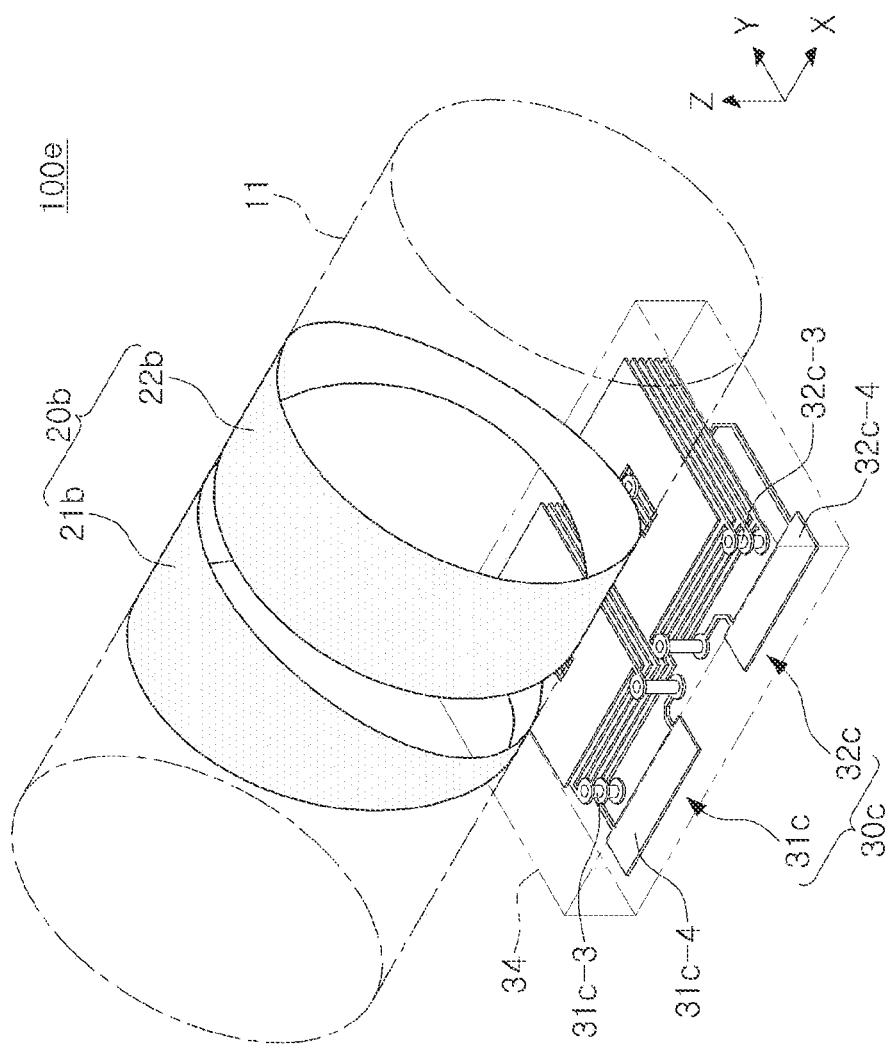

Referring to FIG. 2D, an angular position identification layer 20b in a rotor apparatus and an apparatus for detecting an angular position of a rotor 100e may include a first angular position identification layer 21b and a second angular position identification layer 22b, and an identification inductor 30c may include a first angular position identification inductor 31c and a second angular position identification inductor 32c.

The identification inductor 30c may include a first angular position identification inductor 31c and a second angular position identification inductor 32c. The first angular position identification inductor 31c may be disposed to output magnetic flux toward the first angular position identification layer 21b, and the second angular position identification inductor 32c may be disposed to output magnetic flux toward the second angular position identification layer 22b.

For example, the first angular position identification inductor 31c may have a stack structure in which at least one first coil pattern 31c-1 and at least one first coil insulating layer 31c-2 are alternately stacked, may include a first coil via 31c-3 vertically connected to the first coil pattern 31c-1, and may include a first lead-out portion 31c-4 electrically connected to the at least one first coil pattern 31c-1 and drawn out to a surface of the first angular position identification inductor 31c. For example, the second angular position identification inductor 32c may have a stack structure in which at least one second coil pattern 32c-1 and at least one second coil insulating layer 32c-2 are alternately stacked, may include a second coil via 32c-3 vertically connected to the second coil pattern 32c-1, and may include a second lead-out portion 32c-4 electrically connected to the at least one second coil pattern 32c-1 and drawn out to a surface of the second angular position identification inductor 32c. For example, the first and second angular position identification inductors 31c and 32c may be implemented as a single inductor package 34.

The angular position identification layer 20b may include a first angular position identification layer 21b and a second angular position identification layer 22b. Each of the first and second angular position identification layers 21b and 22b may be disposed to surround a rotational axis (e.g., an X axis) of the rotor 11 and rotate according to rotation of the rotor 11, and may have a width varying depending on an angular position of the rotor 11.

An angular position of the rotor 11 corresponding to a maximum width of the first angular position identification layer 21b may be different from an angular position of the rotor 11 corresponding to a maximum width of the second angular position identification layer 22b. For example, a normal direction of a portion corresponding to the maximum width of the first angular position identification layer 21b may be a −Z direction, and a normal direction of a portion corresponding to the maximum width of the second angular position identification layer 22b may be a +Y direction.

Therefore, an angular position of the rotor 11 corresponding to the maximum value of the first inductance of the first angular position identification inductor 31c may be different from an angular position of the rotor 11 corresponding to the maximum value of the second inductance of the second identification inductor 32c. Therefore, the second inductance of the second identification inductor 32c may be lower than the maximum value of the first inductance of the first angular position identification inductor 31c, when the angular position of the rotor 11 corresponds to the maximum value of the first inductance, and the first inductance of the first angular position identification inductor 31c may be smaller than the maximum value of the second inductance of the second angular position identification inductor 32c, when the angular position of the rotor 11 corresponds to the maximum value of the second inductance.

Therefore, an integrated parameter to which the first and second inductances of the first and second identification inductors 31c and 32c are applied as first and second variables may have a higher correlation with the angular position of the rotor 11, and angular position sensitivity of the integrated parameter according to rotation of the rotor 11 may be higher than sensitivity of each of the first and second inductances of the first and second angular position identification inductors 31c and 32c.

The first and second angular position identification layers 21b and 22b may be disposed such that respective portions of the first and second angular position identification layers 21b and 22b corresponding to the maximum widths of the first and second angular position identification layers 21b and 22b may not overlap each other in the rotation direction of the rotor 11. For example, a smaller value of two X-direction coordinate values of the portion corresponding to the maximum width of the second angular position identification layer 22b may be larger than a larger value of the two X-direction coordinate values of the portion corresponding to the maximum width of the first angular position identification layer 21b.

Therefore, since electromagnetic influence of an eddy current of one of the first and second angular position identification layers 21b and 22b on the other may be reduced, precision and accuracy of the angular position identification of the rotor 11 may be improved.

Figure 3:
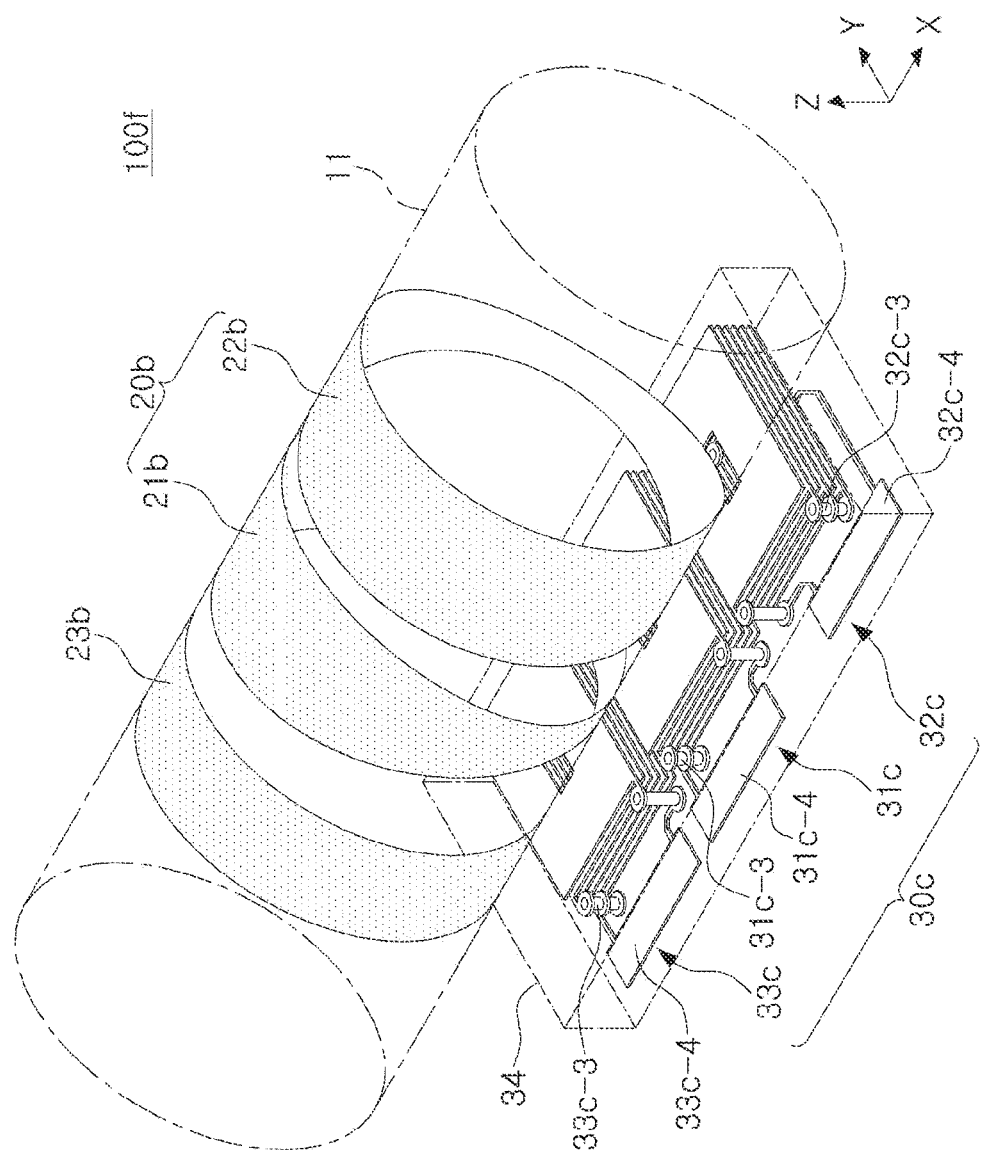
FIG. 3 is a perspective view illustrating a rotor apparatus and an apparatus for detecting an angular position of a rotor, according to an embodiment.
Figure 4A:
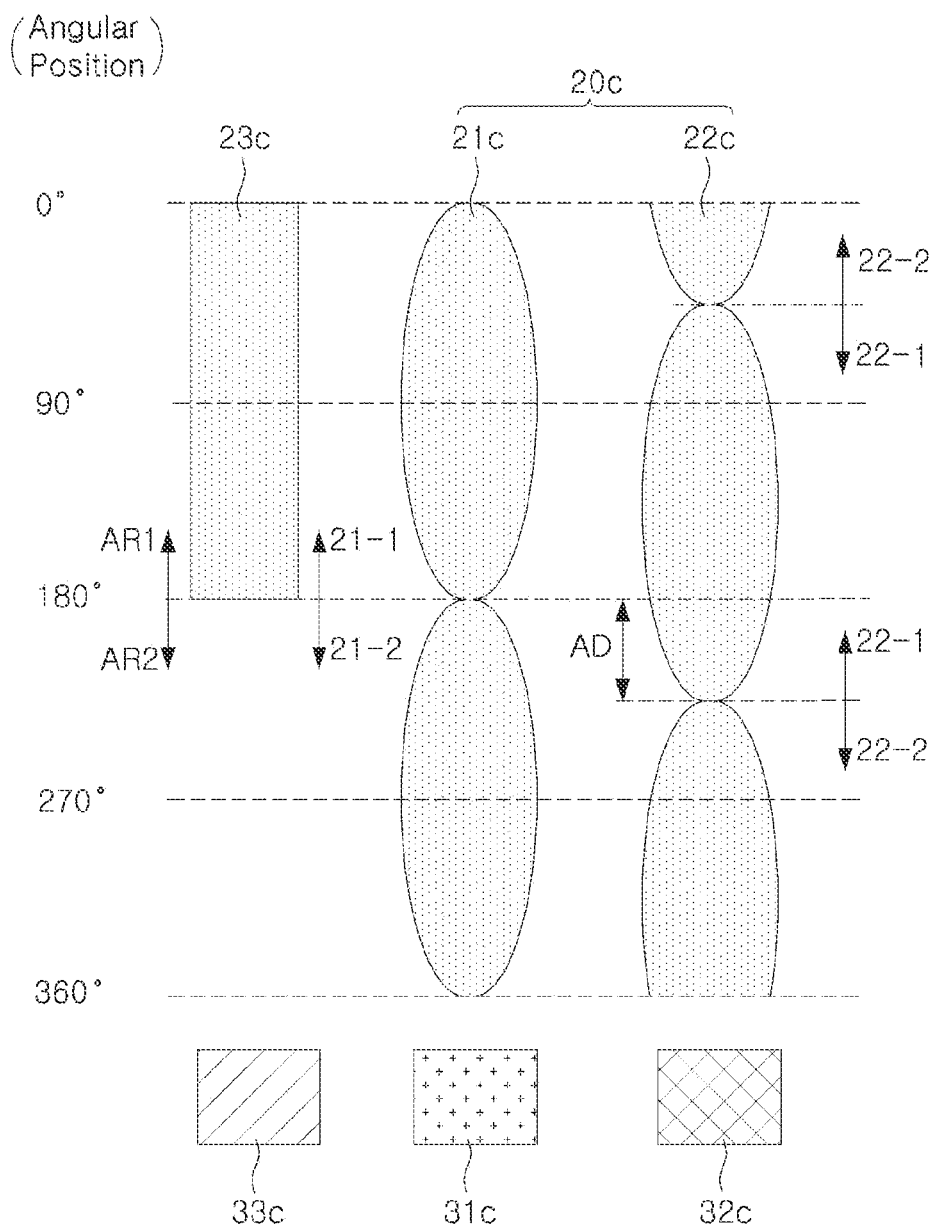
FIG. 4A is a view illustrating a correspondence relationship between an identification layer and an angular position, in a rotor apparatus and an apparatus for detecting an angular position of a rotor, according to an embodiment.
Figure 4B:
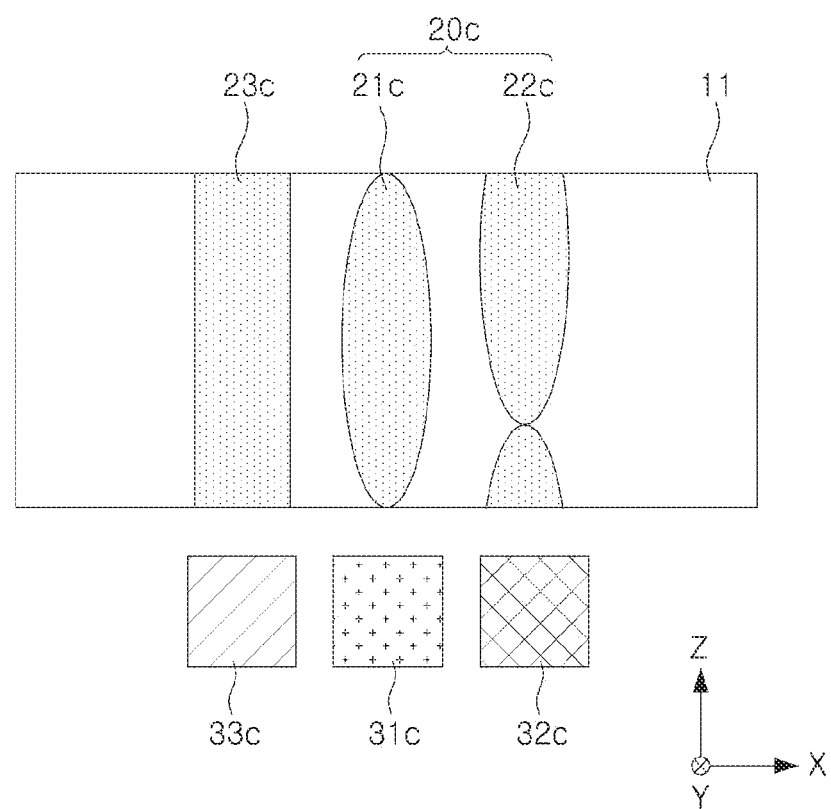
FIG. 4B is a side view illustrating a rotor apparatus and an apparatus for detecting an angular position of a rotor, according to an embodiment.

FIG. 3 is a perspective view illustrating a rotor apparatus and an apparatus for detecting an angular position of a rotor, according to an embodiment. FIG. 4A is a view illustrating a correspondence relationship between an identification layer and an angular position, in a rotor apparatus and an apparatus for detecting an angular position of a rotor, according to an embodiment. FIG. 4B is a side view illustrating a rotor apparatus and an apparatus for detecting an angular position of a rotor, according to an embodiment.

Referring to FIG. 3, a rotor apparatus may include the rotor 11, the angular position identification layer 20b, and an angular range identification layer 23b. An apparatus for detecting an angular position of a rotor 100f may include the rotor 11, the angular position identification layer 20b, the angular range identification layer 23b, the first and second angular position identification inductors 31c and 32c, and an angular range identification inductor 33c.

The angular range identification layer 23b may be disposed to surround the rotational axis (e.g., the X axis) of the rotor 11 and rotate according to rotation of the rotor 11. For example, the angular range identification layer 23b may rotate according to rotation of the rotator 11 by being physically coupled to a side surface of the rotator 11, and may be spaced apart from the angular position identification layer 20b. The angular range identification layer 23b may include a material identical to a material of the angular position identification layer 20b, and may be implemented in the same manner as the angular position identification layer 20b, but is not limited thereto.

The angular range identification inductor 33c may be disposed closer to the angular range identification layer 23b, compared to the angular position identification layer 20b, and may be spaced apart from the angular range identification layer 23b. The angular range identification inductor 33c may have the same structure as the first and second angular position identification inductors 31c and 32c, and may be implemented in the same manner as the first and second angular position identification inductors 31c and 32c, but is not limited thereto. For example, sizes and/or the number of windings of the angular range identification inductor 33c and the first and second angular position identification inductors 31c and 32c may be different from each other.

Referring to FIG. 3, and FIGS. 4A and 4B, the angular range identification layer 23b in a rotor apparatus and an apparatus for detecting an angular position of a rotor may be configured such that a plurality of portions of the angular range identification layer 23b respectively corresponding to a plurality of different angular position ranges AR1 and AR2 of the rotor 11 have different overall widths, and may be configured such that overall inductance of the angular range identification inductor 33c is different in the plurality of different angular position ranges AR1 and AR2 of the rotor 11. In this case, an overall width may be an average width of a corresponding angular position range, and may be a value obtained by integrating a width by a length of the corresponding angular position range.

In this case, the overall width may be 0 or may be greater than 0. For example, one of the plurality of portions angular range identification layer 23b corresponding to the plurality of angular position ranges AR1 and AR2 may have a width of 0 or may include a cut-off portion.

For example, the angular position identification layer 20b may be configured to surround the rotational axis (for example, the X axis) in a surrounding range (e.g., a turn (360 degrees)) and to have a minimum width greater than 0, and the angular range identification layer 23b may be configured to surround the rotational axis (for example, the X axis) in a shorter surrounding range (e.g., 180 degrees), compared to the angular position identification layer 20b.

As shown in FIG. 4A, when an angular position of the rotor 11 is 0 degrees to 180 degrees, an overall width of a portion of the angular range identification layer 23b, closest to the angular range identification inductor 33c, may be relatively large, overall inductance of the angular range identification inductor 33c may be relatively low, and a resonant frequency based on a combination of inductance and constant capacitance of the angular range identification inductor 33c may be relatively increased.

When an angular position of the rotor 11 is 180 degrees to 360 degrees, an overall width of a portion of the angular range identification layer 23b, closest to the angular range identification inductor 33c, may be relatively narrow or may be zero, overall inductance of the angular range identification inductor 33c may be relatively high, and a resonant frequency based on a combination of inductance and constant capacitance of the angular range identification inductor 33c may be relatively lowered.

Therefore, by inductance of the angular range identification inductor 33c, information on which angular position range among a plurality of angular position ranges AR1 and AR2 belongs to an angular position of the rotor 11 may be calculated and processed.

Information based on inductance of the angular range identification inductor 33c may be used to detect a tilt of the rotor 11. For example, one end and the other end of the rotor may revolve finely along with rotation of the rotor, and information based on inductance of the angular range identification inductor 33c may be used to reduce variables based on the revolution in angular position values based on inductance of the first and second angular position identification inductors 31c and 32c. Therefore, accuracy of angular position values based on inductance of the first and second angular position identification inductors 31c and 32c may further increase.

Referring to FIGS. 4A and 4B, an angular position identification layer 20c in a rotor apparatus and an apparatus for detecting an angular position of a rotor may have a width varying with angular positions of the rotor in a plurality of cycles 21-1, 21-2, 22-1, and 22-2 per turn (360 degrees) around the rotational axis.

Therefore, a length of each of the plurality of cycles 21-1, 21-2, 22-1, and 22-2 may be shorter than a circumference of the rotor, and a width change in each of the plurality of cycles 21-1, 21-2, 22-1, and 22-2 may be further increased. For example, a length of a first cycle (21-1 and 22-1) may be identical to a length of a second cycle (21-2 and 22-2), and an angular position difference AD between the plurality of cycles 21-1 and 21-2 of the first angular position identification layer 21c and the plurality of cycles 22-1 and 22-2 of the second angular position identification layer 22c may be ¼ times the length of each of the plurality of cycles 21-1, 21-2, 22-1, and 22-2. An angular position corresponding to a maximum width of the first angular position identification layer 21c may be different from an angular position corresponding to a maximum width of the second angular position identification layer 22c.

As a change in width of the angular position identification layer 20c increases, resolution and sensitivity of angular position detection of the rotor 11 may be further increased. As resolution and sensitivity of angular position detection increase, correlation between a width and an angular position of the angular position identification layer 20c needs to be increased, and a width of the angular position identification layer 20c needs to be more accurately implemented.

For example, a first difference between a design width and an actual width of a portion corresponding to the first cycles 21-1 and 22-1 among the plurality of cycles in the angular position identification layer 20c may be different from a second difference between a design width and an actual width of a portion corresponding to the second cycle 21-2 and 22-2 among the plurality of cycles. When variables corresponding to a difference between the first difference and the second difference in angular position values based on inductance of the first and second angular position identification inductors 31c and 32c are reduced, accuracy of the angular position values may be further increased.

First and second inductance of the first and second angular position identification inductors 31c and 32c may be a parameter that does not reflect whether an angular position of the rotor corresponds to any of the first cycles 21-1 and 22-1 and the second cycles 21-2 and 22-2.

Since inductance of the angular range identification inductor 33c may be a parameter reflecting whether an angular position of the rotor corresponds to any of the plurality of angular position ranges AR1 and AR2, the inductance of the angular range identification inductor 33c may be used to reduce variables corresponding to a difference between characteristics of the first cycles 21-1 and 22-1 and characteristics of the second cycles 21-2 and 22-2 in angular position values based on inductance of the first and second angular position identification inductors 31c and 32c. Therefore, accuracy of the angular position values may be further increased.

For example, a width of each of the plurality of portions corresponding to the plurality of angular position ranges AR1 and AR2 of the angular range identification layer 23c may be constant. Therefore, since inductance of the angular range identification inductor 33c may be used as a reference value (e.g., a temperature reference value) for inductance of the first and second angular position identification inductors 31c and 32c, the first and second angular position identification inductors 31c and 32c may be accurately used in a process of further improving accuracy of the inductance (e.g., a value correction process, a temperature correction process).

For example, the angular range identification layer 23c may have an angular shape between a plurality of portions respectively corresponding to the plurality of angular position ranges AR1 and AR2, and the angular position identification layer 20c may have a smoother boundary line (e.g., a sinusoidal wave-shaped boundary line) than the angled portion of angular range identification layer 23c in the plurality of cycles 21-1, 21-2, 22-1, and 22-2. Therefore, information on which angular position range among the plurality of angular position ranges AR1 and AR2 belongs to an angular position of the rotor 11 may be obtained more stably based on inductance of the angular range identification inductor 33c.

Figure 4C:
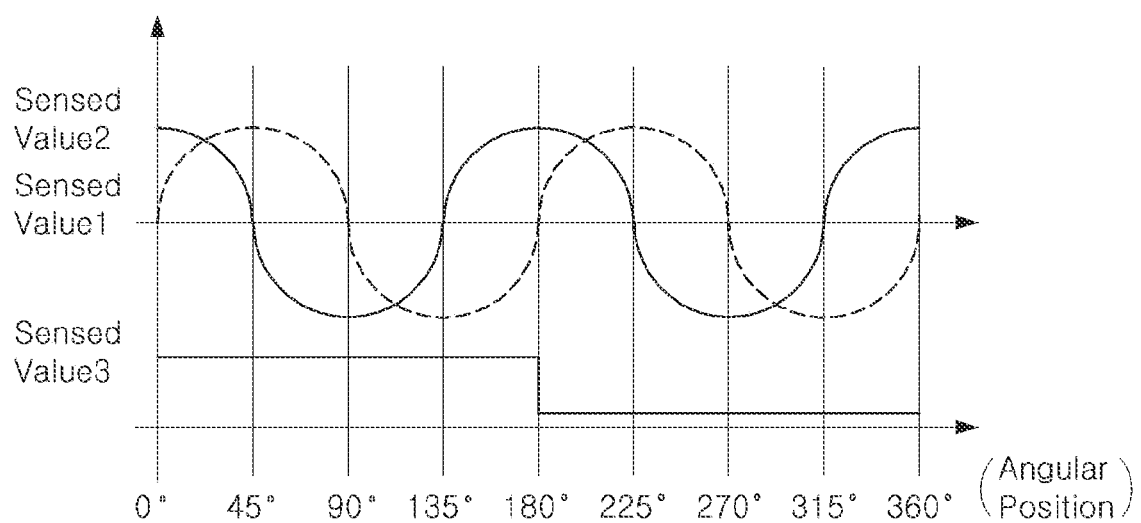
FIG. 4C is a graph illustrating sensed values according to angular positions, in a rotor apparatus and an apparatus for detecting an angular position of a rotor, according to an embodiment.

FIG. 4C is a graph illustrating sensed values according to angular positions, in a rotor apparatus and an apparatus for detecting an angular position of a rotor, according to an embodiment.

Referring to FIG. 4C, a waveform of a first sensed value 1 based on inductance of a first angular position identification inductor may be similar to a shape of a first angular position identification layer, a waveform of a second sensed value 2 based on inductance of a second angular position identification inductor may be similar to a shape of a second angular position identification layer, and a waveform of a third sensed value 3 based on inductance of an angular range identification inductor may be similar to a shape of an angular range identification layer.

A phase difference between a waveform of the first sensed value 1 and a waveform of the second sensed value 2 may be 90 degrees, and the waveform of the first sensed value 1 and the waveform of the second sensed value 2 may be similar to a sinusoidal wave. The waveform of the third sensed value 3 may be similar to a square.

The first sensed value 1, the second sensed value 2, and the third sensed value 3 may respectively correspond to a resonant frequency. A median value or a minimum value of each of the first sensed value 1, the second sensed value 2, and the third sensed value 3 may be normalized to 0, and a maximum value of each of the first sensed value 1, the second sensed value 2, and the third sensed value 3 may be normalized to 1.

Figure 5A:
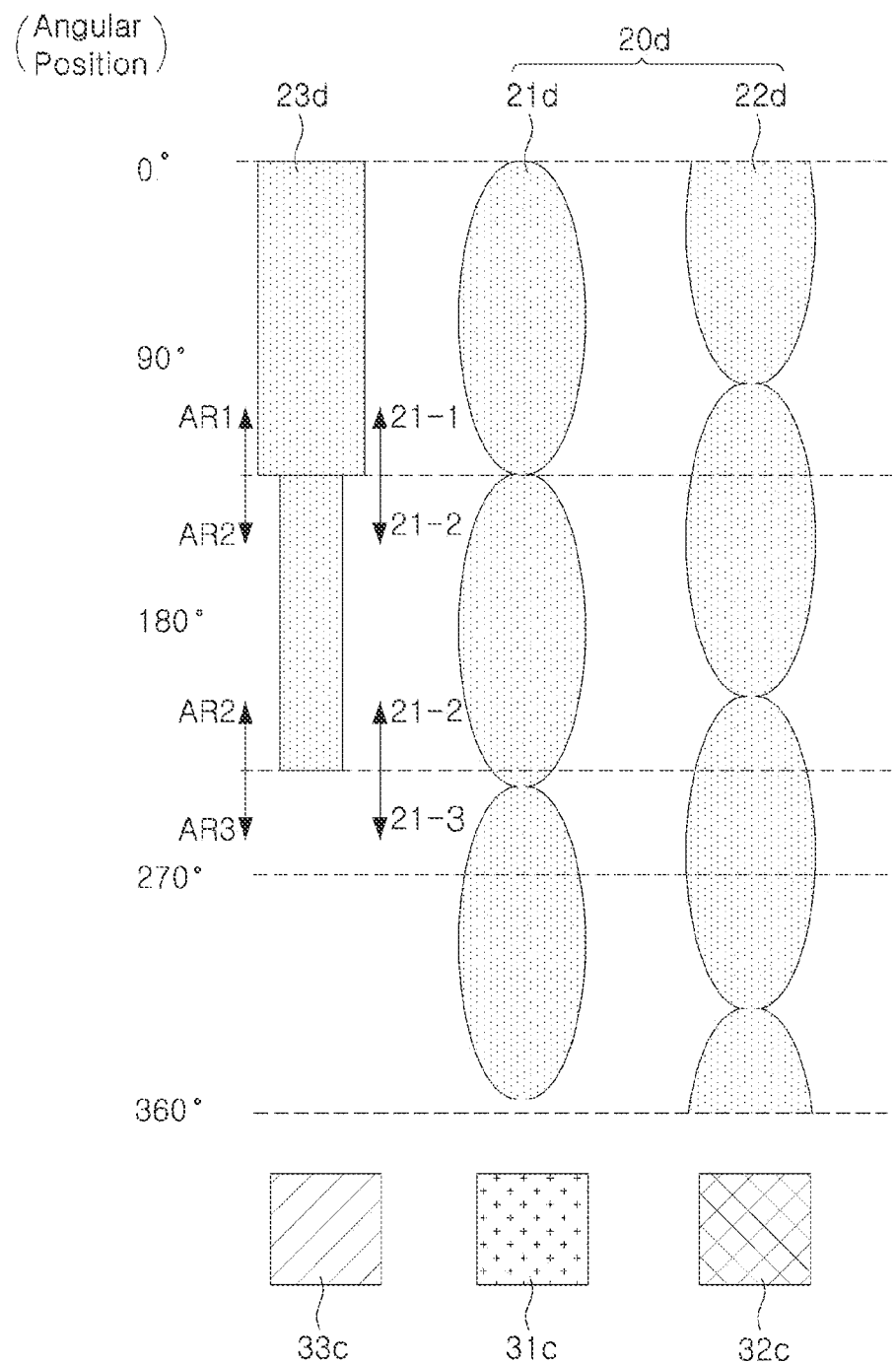
FIGS. 5A and 5B are views illustrating a structure in which the number of a plurality of angular position ranges of a rotor increases, in a rotor apparatus and an apparatus for detecting an angular position of a rotor, according to an embodiment.
Figure 5B:
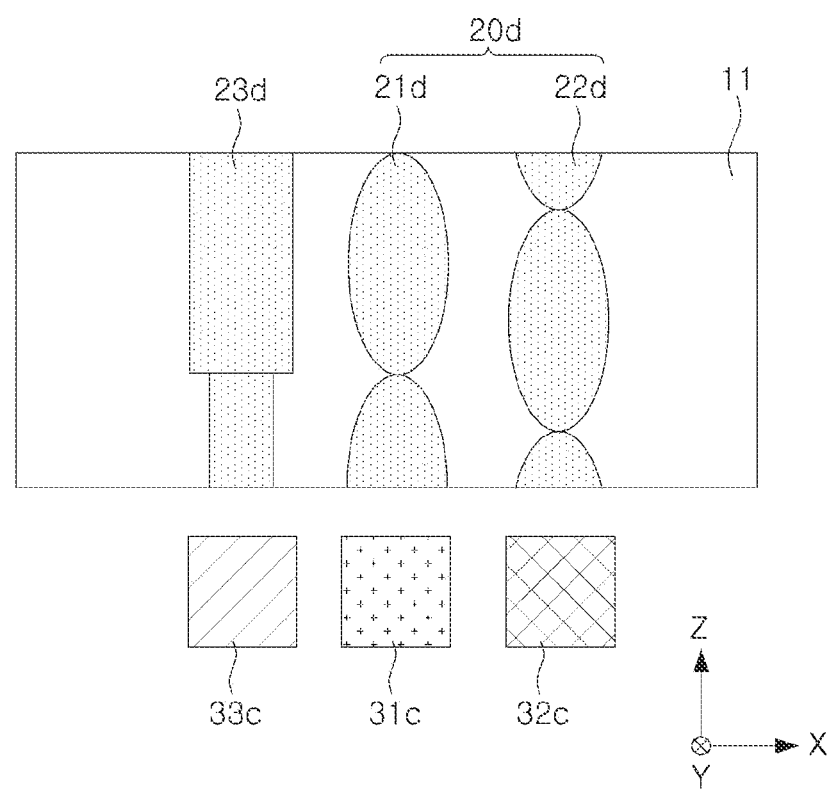

FIGS. 5A and 5B are views illustrating a structure in which the number of a plurality of angular position ranges of a rotor is increased, in a rotor apparatus and an apparatus for detecting an angular position of a rotor, according to an embodiment of the present disclosure.

Referring to FIGS. 5A and 5B, the number of a plurality of angular position ranges AR1, AR2, and AR3 of an angular range identification layer 23d may be increased, and the number of a plurality of cycles 21-1, 21-2, and 21-3 of an angular position identification layer 20d may also be increased.

Since first and second angular position identification layers 21d and 22d surround a rotor 11, even when a phase difference between the first and second angular position identification layers 21d and 22d is not zero, reference angular positions (e.g., between AR1 and AR2 and/or between AR2 and AR3) of the plurality of cycles 21-1, 21-2, and 21-3 of the first and second angular position identification layer 21d and 22d may be the same as each other.

Figure 6:
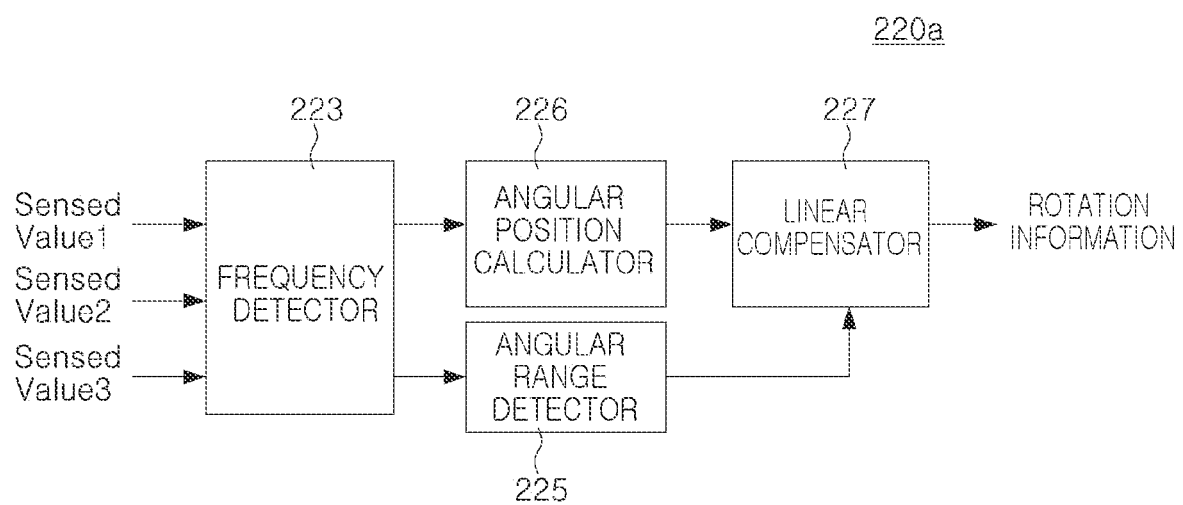
FIG. 6 is a view illustrating a process of generating rotation information, in a rotor apparatus and an apparatus for detecting an angular position of a rotor, according to an embodiment.

FIG. 6 is a view illustrating a process of generating rotation information, in a rotor apparatus and an apparatus for detecting an angular position of a rotor, according to an embodiment.

Referring to FIG. 6, a rotor apparatus and an apparatus for detecting an angular position of a rotor may further include a processor 220a. The processor 220a may include any one or any combination of any two or more of a frequency detector 223, an angular range detector 225, an angular position calculator 226, and a linear compensator 227. The processor 220a may include either one or both of an analog circuit (e.g., an analog-to-digital converter, a buffer) and a digital processor (e.g., a CPU).

The frequency detector 223 may apply a voltage or a current to an identification inductor (e.g., the angular position identification inductor 30c, and the angular range identification inductor 33c) and a capacitor, detect a current or a voltage of the identification inductor and the capacitor according to the applied voltage or the applied current, and detect a resonant frequency based on inductance of the identification inductor and capacitance of the capacitor, and may detect the resonant frequency periodically by a sample-hold manner or the like.

The angular range detector 225 may generate information on which angular position range among a plurality of angular position ranges belongs to an angular position of a rotor 11, based on the inductance of the angular range identification inductor (e.g., the angular range identification inductor 33c) and the resonant frequency.

The angular position calculator 226 may detect the angular position of the rotor 11 based on the inductance of the angular position identification inductor (e.g., the angular position identification inductor 30c) and the resonant frequency, and may generate a comprehensive value of first and second inductance of first and second angular position identification inductors (e.g., the first and second angular position identification inductors 31c and 32c), respectively.

The comprehensive value of the first and second inductances may be values obtained by arc-tangent (arctan) processing a value in which one of the first and second inductance is a denominator variable and remaining inductance is a numerator variable. Therefore, the comprehensive value of the first and second inductance may be linearized.

The linear compensator 227 may output more linearized rotation information values from output values of the angular position calculator 226.

For example, the linear compensator 227 may generate corrected angular position values from inductance of an angular position identification inductor, based on one correction logic selected based on the inductance of the angular range identification inductor, among a plurality of correction logics. The plurality of correction logics may be stored in the processor 220a or in a memory electrically connected to the processor 220a. For example, a first correction logic may be based on a first polynomial equation and/or a first look-up table, and second correction logic may be based on a second polynomial equation and/or a second look-up table.

For example, the linear compensator 227 may generate corrected angular position values from a comprehensive value of first and second inductance of first and second angular position identification inductors, based on one correction logic selected based on the inductance of the angular range identification inductor, among a plurality of correction logics.

For example, among a plurality of cycles in an angular range identification layer, when characteristics of a portion corresponding to a first cycle (e.g., a difference between a design width and an actual width) are different from characteristics of a portion corresponding to a second cycle, among a plurality of correction logics, a first correction logic may be configured to be further optimized for the first cycle, and a second correction logic may be configured to be further optimized for the second cycle.

Therefore, the linear compensator 227 may linearize output values of the angular position calculator 226 more accurately and quickly.

Figure 7A:
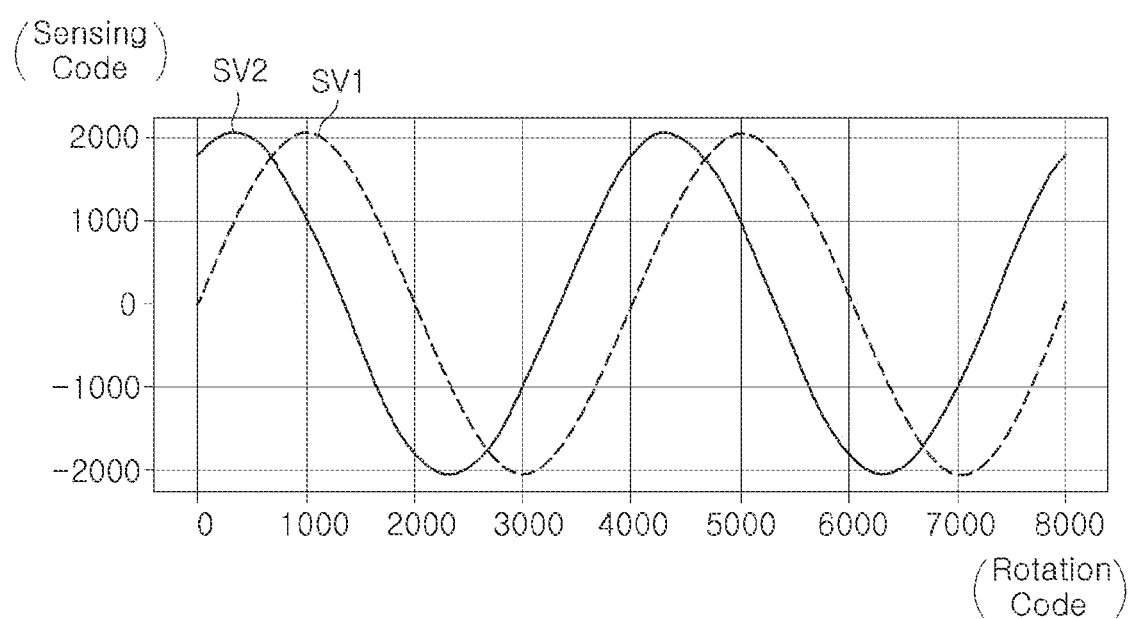
FIG. 7A is a graph illustrating sensed values provided by the frequency detector of FIG. 6, according to an embodiment.
Figure 7B:
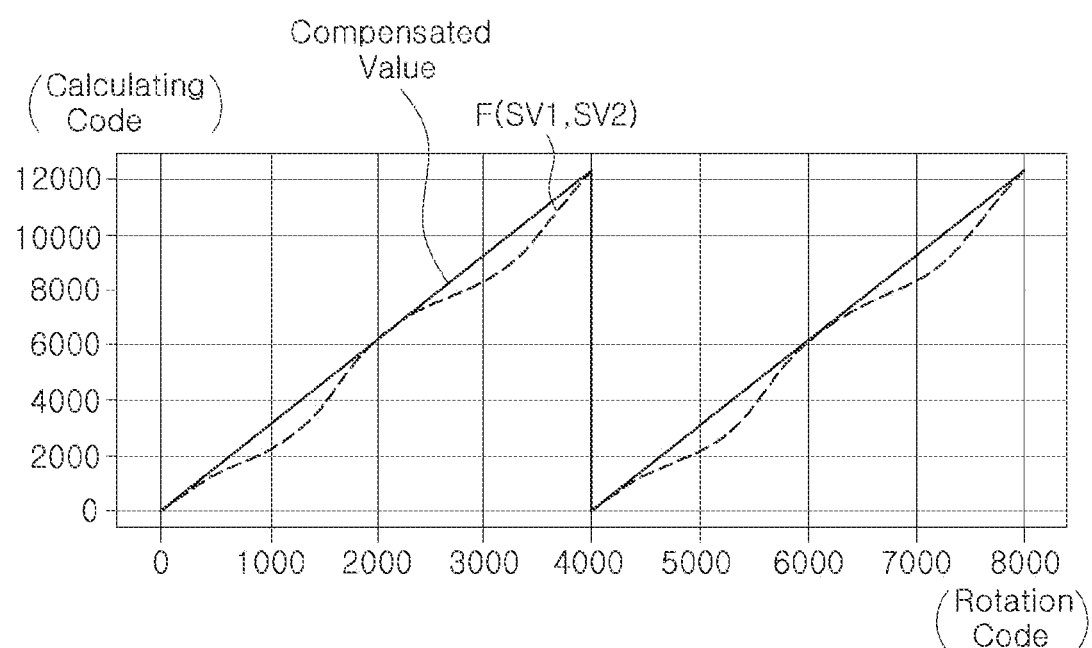
FIG. 7B is a graph illustrating input values and output values of the linear compensator of FIG. 6, according to an embodiment.

FIG. 7A is a graph illustrating sensed values provided by the frequency detector of FIG. 6, according to an embodiment. FIG. 7B is a graph illustrating input values and output values of the linear compensator of FIG. 6, according to an embodiment.

Referring to FIG. 7A, a first waveform SV1 of the first sensed value 1 and a second waveform SV2 of the second sensed value 2, input to the frequency detector 223, may be similar to a sinusoidal wave, respectively, may have a phase difference of 90 degrees with each other, and may be set as a code and processed digitally.

Since the phase difference between the first and second waveforms SV1 and SV2 is similar to 90 degrees, one of the first and second inductances may correspond to sin (angular position) and the other may correspond to cos (angular position).

In a trigonometric model, an angle from a reference point to one point of a circle may correspond to the angular position of the rotor, a distance from the reference point to the one point of the circle may be r, and an X direction vector value and a Y direction vector value from the reference point to the one point of the circle may be x and y, respectively.

In this case, sin (angular position) may be (y/r) and cos (angular position) may be (x/r). tan (angular position) may be (y/x), i.e., {sin (angular position)}/{cos (angular position)}, and may be (second inductance)/(first inductance).

Therefore, arctan{(second inductance)/(first inductance)} may correspond to an angular position and may be arctan-processed values.

Referring to FIG. 7B, the comprehensive value F(SV1, SV2) of the first and second inductances of the first and second angular position identification inductors may be arctan-processed values, and may be values further linearized by the linear compensator (Compensated Value), and each of the comprehensive value (F(SV1, SV2)) and the linearized values (Compensated Value) may be set as a code and processed digitally.

Figure 8A:
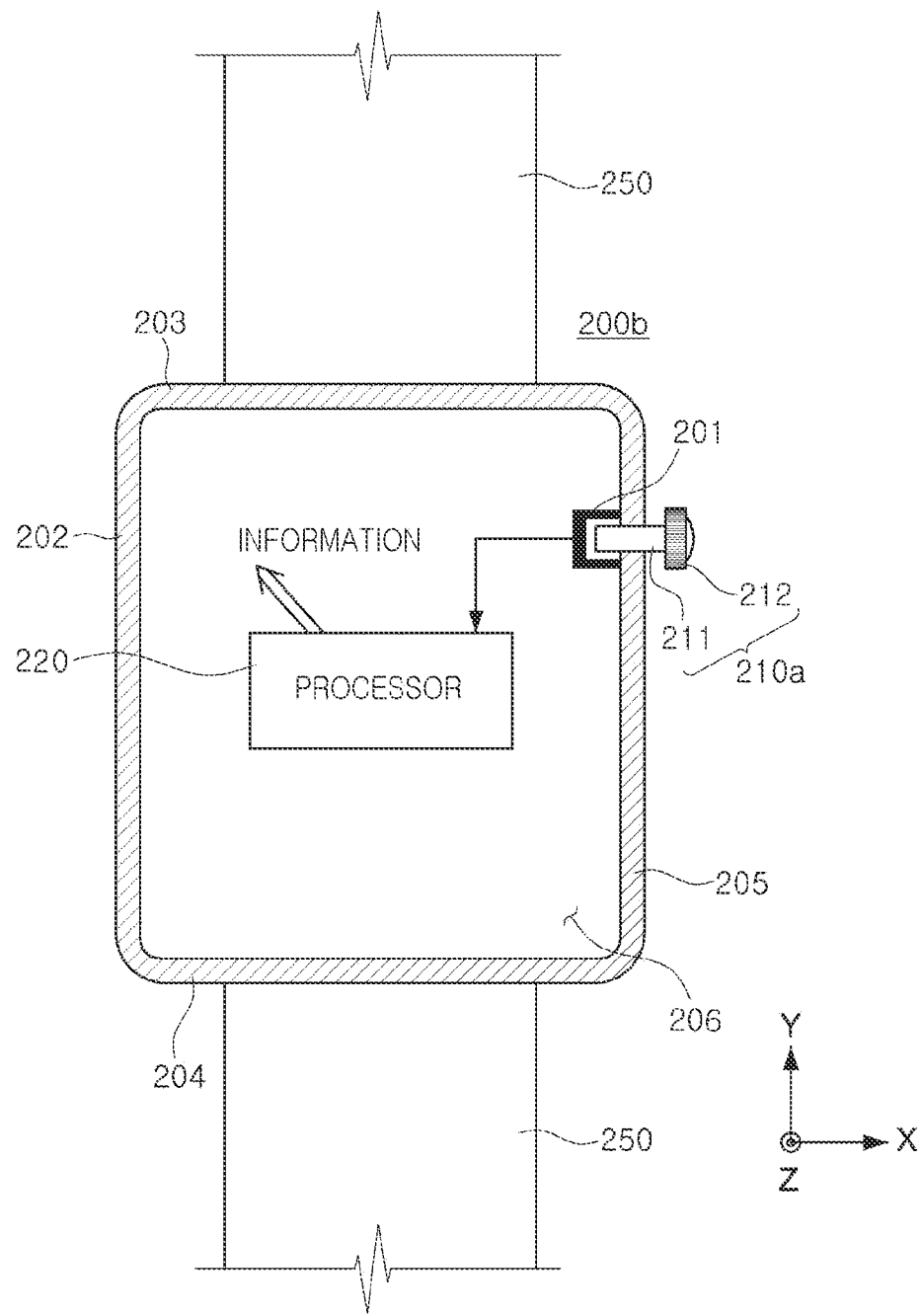
FIGS. 8A and 8B are views illustrating an electronic device including a rotor apparatus and an apparatus for detecting an angular position of a rotor, according to an embodiment.
Figure 8B:
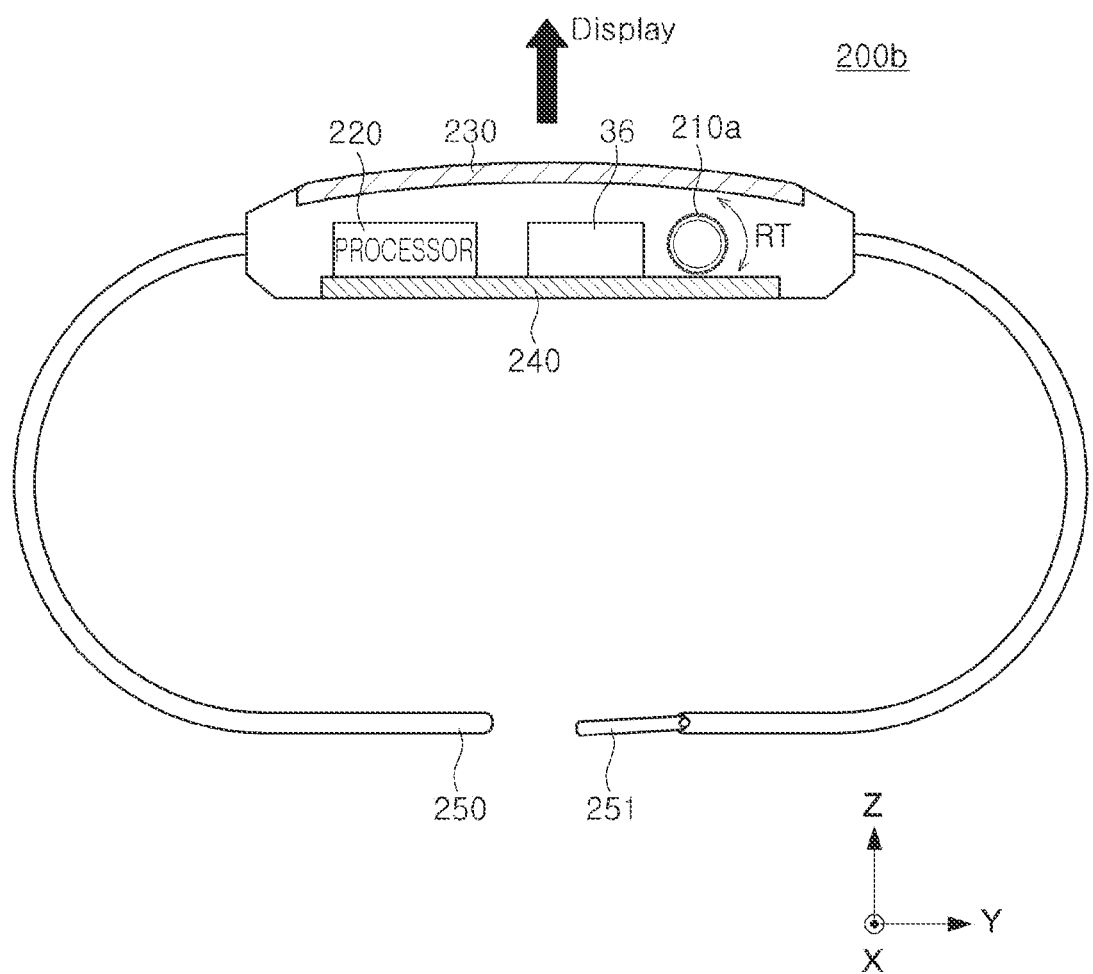

FIGS. 8A and 8B are views illustrating an electronic device including a rotor apparatus and an apparatus for detecting an angular position of a rotor, according to an embodiment.

Referring to FIG. 8A, an electronic device 200b may include, for example, a main body including at least two among a first surface 205, a second surface 202, a third surface 203, and a fourth surface 204.

For example, the electronic device 200b may be a smartwatch, a smartphone, a personal digital assistant, a digital video camera, a digital still camera, a network system, a computer, a monitor, a tablet, a laptop, a netbook, a television, a video game, an automotive device, or the like, but is not limited to such examples.

The electronic device 200b may include a processor 220, may include a storage element for storing information, such as a memory or a storage, and may include a communication element for remotely transmitting and receiving information, such as a communication modem or an antenna.

The processor 220 may be disposed in an internal space 206 of the main body. For example, the processor 220 may include a central processing unit (CPU), a graphic processing unit (GPU), a microprocessor, an application specific integrated circuit (ASIC), field programmable gate arrays (FPGA), and the like, and may have multiple cores. For example, the processor 220 may input/output information for the storage element or the communication element.

The processor 220 may arc-tangent process a value including a denominator variable corresponding to one inductance of first and second inductors in a rotor apparatus and an apparatus for detecting an angular position of a rotor 210a, and a numerator variable corresponding to another inductance of the first and second inductors, thereby generating an angular position value. Therefore, the electronic device 200b may efficiently detect angular position information of the rotor apparatus 210a.

The rotor apparatus and the apparatus for detecting an angular position of a rotor 210a may include a rotor 211 and a rotating head 212, and may be disposed on the first surface 205 of the main body.

A housing 201 may surround at least a portion of the rotor apparatus and the apparatus for detecting an angular position of a rotor 210a. The housing 201 may be coupled to the first surface 205 of the main body. For example, the housing 201 and the main body may be formed of an insulating material such as plastic.

The generated angular position value may be transmitted to the processor 220. For example, the processor 220 may generate information based on the received angular position value, may transmit the generated information to the storage element or the communication element, and may control a display member 230 (FIG. 8B) to output display information in the Z direction on the basis of the generated information.

Referring to FIGS. 8A and 8B, the electronic device 200b may be connected to any one or any combination of any two or more of the first, second, third and fourth surfaces 205, 202, 203, and 204 of the main body, and may further include a strap 250 that is more flexible than the main body.

Therefore, since the strap 250 may be disposed over a user (or clothing of a user) of the electronic device 200b, the user may use the electronic device 200b conveniently. For example, one end and the other end of the strap 250 may be coupled to each other through a coupling portion 251.

Referring to FIG. 8B, the electronic device 200b may include the display member 230 and an electronic device substrate 240, and may further include a processor 36.

The display member 230 may output display information in a normal direction (e.g., the Z direction), different from a normal direction (e.g., an X direction and/or a Y direction) of the first, second, third and fourth surfaces 205, 202, 203, and 204 of the main body. The normal direction of the display member 230 and the normal direction of the display surface of the main body of the electronic device 200b may be the same.

At least a portion of the display information output by the display member 230 may be based on information generated by the processor 220. For example, the processor 220 may transmit display information based on the generated information to the display member 230.

For example, the display member 230 may have a structure in which a plurality of display cells are two-dimensionally arranged, and may receive a plurality of control signals based on operation information of the electronic device from the processor 220 or a separate processor. The plurality of display cells may be configured such that whether to display and/or a color may be determined on the basis of a plurality of control signals. For example, the display member 230 may further include a touch screen panel, and may be implemented using a relatively flexible material such as an OLED.

The electronic device substrate 240 may provide a dispositional space for the processor 220 and may provide an information transmission path between the processor 220 and the display member 230. For example, the electronic device substrate 240 may be implemented as a printed circuit board (PCB).

The processor 220 may be implemented similarly to the processor illustrated in FIGS. 1 and 6, and may be separated from a rotor apparatus and an apparatus for detecting an angular position of a rotor 210a and disposed on the substrate 240, differently from the processor illustrated in FIG. 1.

According to embodiments disclosed herein, efficiency and/or accuracy of detecting an angular position of a rotor may be improved.

According to embodiments disclosed herein, linearity of detecting an angular position of a rotor may efficiently increase, and a tilt variable and/or a process distribution variable of the rotor may decrease, when the angular position is detected.

The processors 36, 220, and 220a, the frequency detector 223, the angular range detector 225, the angular position calculator 226, and the linear compensator 227 in FIGS. 1 to 8B that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 8B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD- Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A rotor apparatus, comprising:
    a rotor configured to rotate around a rotational axis;
    an angular position identification layer disposed to surround the rotational axis and configured to rotate according to rotation of the rotor, and having a width varying with angular positions of the rotor; and
    an angular range identification layer disposed to surround the rotational axis and configured to rotate according to the rotation of the rotor, and configured such that a plurality of portions of the angular range identification layer respectively corresponding to a plurality of different angular position ranges of the rotor have different overall widths,
    wherein the angular position identification layer comprises:
        a first angular position identification layer disposed to surround the rotational axis and configured to rotate according to the rotation of the rotor, and having a width varying with the angular positions of the rotor in a plurality of cycles per turn around the rotational axis; and
        a second angular position identification layer disposed to surround the rotational axis rotor and configured to rotate according to the rotation of the rotor, and having a width varying with the angular positions of the rotor at the plurality of cycles per turn around the rotational axis, and
    wherein the first and second angular position identification layers are disposed to be spaced apart from each other.

2. The rotor apparatus of claim 1, wherein the angular position identification layer and the angular range identification layer comprise any one or any combination of any two or more of copper, silver, gold, and aluminum as a material different from a material of the rotor, respectively.

3. The rotor apparatus of claim 1, wherein each of the first and second angular position identification layers has a sinusoidal wave-shaped boundary line.

4. The rotor apparatus of claim 1, wherein an angular position of the rotor, among the angular positions of the rotor, corresponding to a maximum width of the first angular position identification layer is different from an angular position of the rotor, among the angular positions of the rotor, corresponding to a maximum width of the second angular position identification layer.

5. The rotor apparatus of claim 4, wherein a length of the first angular position identification layer per cycle of the plurality of cycles is identical to a length of the second angular position identification layer per cycle of the plurality of cycles, and
    wherein a difference between the angular position of the rotor corresponding to the maximum width of the first angular position identification layer and the angular position of the rotor corresponding to the maximum width of the second angular position identification layer is equal to ¼ times the length of each of the first and second angular position identification layers per cycle.

6. The rotor apparatus of claim 1, wherein the width varying with angular positions of the rotor varies at a plurality of cycles per turn around the rotational axis, and
    wherein a length of each of the plurality of angular position ranges of the angular range identification layer is identical to a length of the angular position identification layer per cycle of the plurality of cycles.

7. The rotor apparatus of claim 1, wherein each of the plurality of portions respectively corresponding to the plurality of angular position ranges of the angular range identification layer has a constant width.

8. The rotor apparatus of claim 1, wherein the angular range identification layer has an angular shape between the plurality of portions of the angular range identification layer respectively corresponding to the plurality of angular position ranges of the rotor, and
    wherein the angular position identification layer has a smoother boundary line than the angular portion of the angular range identification layer in plurality of cycles.

9. The rotor apparatus of claim 1, wherein one of the plurality of portions of the angular range identification layer corresponding to the plurality of angular position ranges of the rotor includes a portion having a width of 0 or a cut off portion.

10. A rotor apparatus, comprising:
    a rotor configured to rotate around a rotational axis;
    an angular position identification layer disposed to surround the rotational axis rotor and configured to rotate according to rotation of the rotor, and having a width varying with angular positions of the rotor; and
    an angular range identification layer disposed to surround the rotational axis and configured to rotate according to the rotation of the rotor,
    wherein the angular range identification layer is configured to surround the rotational axis in a first surrounding range shorter than a second surrounding range in which the angular position identification layer surrounds the rotational axis,
    wherein the angular position identification layer comprises:

a first angular position identification layer disposed to surround the rotational axis and configured to rotate according to rotation of the rotor, and having a width varying with the angular positions of the rotor in a plurality of cycles per turn around the rotational axis; and a second angular position identification layer disposed to surround the rotational axis and configured to rotate according to the rotation of the rotor, and having a width varying with the angular positions of the rotor at the plurality of cycles per turn around the rotational axis, wherein the first and second angular position identification layers are disposed to be spaced apart from each other.

11. The rotor apparatus of claim 10, wherein the angular range identification layer has a constant width, wherein the angular position identification layer has a minimum width greater than zero, and wherein the second surrounding range is one turn of the rotor.

12. The rotor apparatus of claim 10, wherein the angular range identification layer is configured such that a plurality of portions of the angular range identification layer respectively corresponding to a plurality of different angular position ranges of the rotor have different overall widths, and wherein the width varying with angular positions of the rotor varies in at least three cycles per turn around the rotational axis.

13. The rotor apparatus of claim 10, wherein an angular position of the rotor, among the angular positions of the rotor, corresponding to a maximum width of the first angular position identification layer is different from an angular position of the rotor, among the angular positions of the rotor, corresponding to a maximum width of the second angular position identification layer.

14. An apparatus for detecting an angular position of a rotor, comprising:

an angular position identification inductor;

an angular range identification inductor;

a rotor configured to rotate around a rotational axis;

an angular position identification layer disposed to surround the rotational axis and configured to rotate according to rotation of the rotor, and configured to change an inductance of the angular position identification inductor according to angular positions of the rotor; and an angular range identification layer disposed to surround the rotational axis and configured to rotate according to the rotation of the rotor, and configured such that an overall inductance of the angular range identification inductor is different in a plurality of different angular position ranges of the rotor, wherein the angular position identification layer comprises first and second angular position identification layers arranged to surround the rotational axis and configured to rotate according to the rotation of the rotor, respectively, wherein the angular position identification inductor comprises a first angular position identification inductor disposed closer to the first angular position identification layer, compared to the second angular position identification layer, and a second angular position identification inductor disposed closer to the second angular position identification layer, compared to the first angular position identification layer, and wherein the first and second angular position identification layers are configured such that an angular position of the rotor, among the angular positions of the rotor, at which the first angular position identification inductor has a maximum inductance or a minimum inductance is different from an angular position of the rotor, among the angular positions of the rotor, at which the second angular position identification inductor has a maximum inductance or a minimum inductance.

15. The apparatus of claim 14, further comprising a processor configured to generate an angular position value corrected from the inductance of the angular position identification inductor, based on one correction logic selected based on the inductance of the angular range identification inductor, among a plurality of correction logics.

16. The apparatus of claim 14, further comprising a processor configured to generate a comprehensive value of first and second inductances of the first and second angular position identification inductors, based on one correction logic selected based on the inductance of the angular range identification inductor, among plurality of correction logics.

17. The apparatus of claim 16, wherein the comprehensive value of the first and second inductances is a value obtained by arc-tangent (arctan) processing a value in which one of the first and second inductances is a denominator variable and remaining inductance is a numerator variable.

* * * * *